June 25, 1929.  J. W. LUOMA  1,718,700
COMBINATION SHOCK ABSORBER AND AIR COMPRESSOR
Filed May 10, 1927
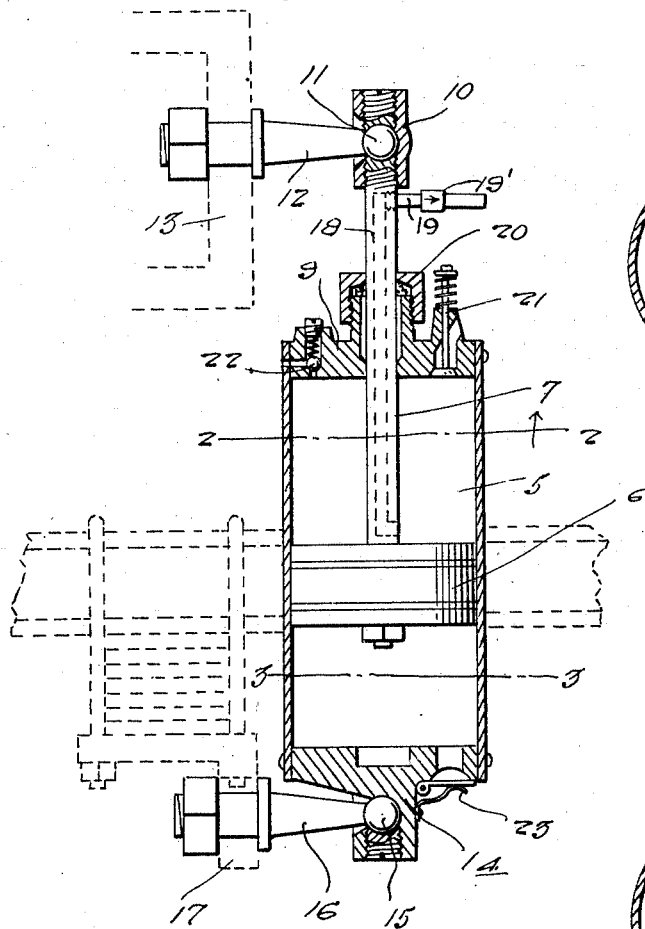
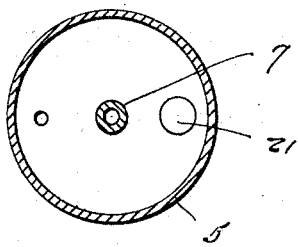
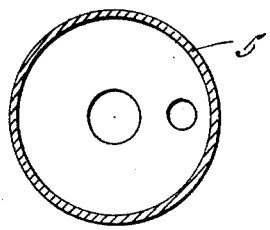
Inventor
John William Luoma
By *Clarence A. O'Brien*
Attorney Patented June 25, 1929.

1,718,700

UNITED STATES PATENT OFFICE.

JOHN WILLIAM LUOMA, OF STUART, FLORIDA.

COMBINATION SHOCK ABSORBER AND AIR COMPRESSOR.

Application filed May 10, 1927. Serial No. 190,357.

My invention relates to shock absorbers for vehicles and has for an object to provide means actuated thereby to force air under pressure to a supply tank carried by a vehicle, and which may be utilized in furnishing air to the vehicle tires.

Another object is to provide an apparatus of this character of simple and practical construction and easily adapted to be installed upon an automobile or similar vehicle.

Other objects and advantages reside in the special construction, combination and arrangement of the various elements, forming the invention, as more fully hereinafter described and claimed, reference being had to the accompanying drawing forming part hereof, wherein like numerals refer to like parts throughout, and in which:—

Figure 1 is a vertical sectional view of my device in operative position upon a vehicle.

Fig. 2 is a transverse sectional view taken along the line 2—2 of Fig. 1, and

Fig. 3 is a similar view taken along a line 3—3 of Fig. 1.

Referring now to the drawing, I have shown my invention as comprising an air cylinder 5, within which is slidably mounted a piston 6, the piston being secured at the lower end of a piston rod 7 which extends upwardly of the upper end of the cylinder 9, and is provided with a suitable coupling 10 for attaching to a ball joint 11 carried on a bracket 12 adapted to be secured to the chassis frame 13 of a vehicle.

The lower end of the cylinder 14 is secured likewise, by a ball joint 15 carried on a similar bracket 16 adapted to be attached to the axle 17 of the machine.

The piston rod 7 is provided with an air passage 18 extending longitudinally therethrough, with its lower end communicating with the cylinder above the piston and its upper end terminating in a coupling 19 having a check valve 19′ therein, and to which coupling may be attached an air hose leading to an air supply tank (not shown). In normal running position the piston 6 occupies the upper portion of the cylinder and upon contact with any road irregularity, the action of the machine will tend to move the piston downwardly within the same and on the return stroke of the piston to normal position, air will be forced through the air passage 18 and coupling 19 in the air supply tank, where the same is properly stored for use in inflating the vehicle tires.

The upper end of the cylinder is provided with a suitable rod packing nut 20 and also air intake valves 21 and an air discharge valve 22, both of which are provided with means for adjusting the same. The lower end of the cylinder is likewise provided with an air discharge valve 23. The valves 22 and 23 constitute pressure relief valves adapted to permit the escape of air from the cylinder after reaching a certain predetermined pressure to insure the smooth movement of the piston for the entire distance of the stroke thereof.

It is obvious from the foregoing explanation that the device is susceptible to various changes in modification, without departing from the spirit of the invention, or the scope of the appended claims, and I accordingly claim all such forms of the invention, to which I am entitled.

Having thus described my invention, what I claim as new is:—

In combination, a shock absorber comprising a cylinder having a piston slidably arranged therein and air intake and discharge valves communicating therewith, a piston rod attached to said piston extending outwardly from the cylinder and having an air passage extending longitudinally therethrough, the inner end of said passage communicating with the cylinder and the outer end thereof adapted to be connected to an air supply tank feed line, swivelly arranged vehicle frame attaching means for the outer end of the piston rod and swivelly arranged axle attaching means for the opposite end of the cylinder.

In testimony whereof I affix my signature.

JOHN WILLIAM LUOMA.